(12) United States Patent
Iwahashi

(10) Patent No.: US 6,816,831 B1
(45) Date of Patent: Nov. 9, 2004

(54) LANGUAGE LEARNING APPARATUS AND METHOD THEREFOR

(75) Inventor: Naoto Iwahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 09/699,251

(22) Filed: Oct. 27, 2000

(30) Foreign Application Priority Data

Oct. 28, 1999 (JP) ............................................. 11-307703

(51) Int. Cl.$^7$ ............................................. G01L 15/00
(52) U.S. Cl. ............................................. 704/9; 704/257
(58) Field of Search ............................... 704/9, 251, 257

(56) References Cited

U.S. PATENT DOCUMENTS

| | | | |
|---|---|---|---|
| 5,109,509 A | * 4/1992 | Katayama et al. | 704/9 |
| 5,555,169 A | * 9/1996 | Namba et al. | 704/9 |
| 5,761,637 A | * 6/1998 | Chino | 704/231 |
| 6,052,656 A | * 4/2000 | Suda et al. | 704/9 |
| 6,697,089 B1 | * 2/2004 | Bryan | 345/747 |

* cited by examiner

*Primary Examiner*—Daniel Abebe
(74) *Attorney, Agent, or Firm*—Frommer Lawrence & Haug LLP; William S. Frommer

(57) ABSTRACT

A language learning apparatus includes a syntax-structure analyzing unit and a syntax-rule learning unit. The syntax-structure analyzing unit is provided with a speech recognition portion for recognizing a word string from input speech data $O_i$ based on speech pattern information of a vocabulary-information storage unit. A semantic analyzer detects image patterns from input moving picture data $V_i$ by using the information stored in the vocabulary-information storage unit, and analyzes the relevance of the detected image patterns and outputs a concept representation using the words corresponding to the individual image patterns. A relevance analyzer verifies the word string extracted by the speech recognition portion against the semantic representation extracted by the semantic analyzer so as to determine the syntax structure of the word string. Then, the syntax-rule learning unit learns the syntax rule by using the determined syntax structure.

82 Claims, 7 Drawing Sheets

FIG. 7

| | LANGUAGE INFORMATION | NON-LANGUAGE INFORMATION | LANGUAGE KNOWLEDGE |
|---|---|---|---|
| 1 | PREPOSITION AND NOUNS BEFORE AND AFTER (TEXT) | MEANING OF THE PREPOSITION (SYMBOLIC REPRESENTATION) | MEANING OF THE PREPOSITION DEPENDENT ON NOUNS BEFORE AND AFTER (SYMBOLIC REPRESENTATION) |
| 2 | PREPOSITION, VERB, AND NOUN (TEXT) | MEANING OF THE PREPOSITION (SYMBOLIC REPRESENTATION) | MEANING OF THE PREPOSITION DEPENDENT ON VERB AND NOUN (SYMBOLIC REPRESENTATION) |
| 3 | SENTENCE (TEXT) | WHETHER THE REACTION MADE BY THE SYSTEM IS TRUE OR FALSE | CONTRIBUTION RATE OF THE WORD FOR THE SYSTEM'S REACTION |
| 4 | SENTENCE (TEXT) | SEMANTIC REPRESENTATION OF SYMBOLIC SENTENCE | MEANING OF THE WORD (SYMBOLIC REPRESENTATION) |
| 5 | SENTENCE (TEXT) AND SYMBOLIC VOCABULARY INFORMATION | | SYNTAX RULE |
| 6 | WORD (TEXT) | GRAPHICS (COMPUTER GRAPHICS) | MEANING OF THE WORD (GRAPHIC PATTERN) |
| 7 | WORD (SOUND) | GRAPHICS (COMPUTER GRAPHICS) | MEANING OF THE WORD (GRAPHIC PATTERN) |
| 8 | SENTENCE (ISOLATED WORD SPEECH) | WHETHER THE REACTION MADE BY THE SYSTEM IS TRUE OR FALSE | CONTRIBUTION RATE OF THE WORD FOR THE SYSTEM'S REACTION |

LANGUAGE LEARNING APPARATUS AND METHOD THEREFOR

BACKGROUND OF THE INVENTION

1. Field of the Invention

The present invention generally relates to language learning apparatuses and methods therefor. More particularly, the invention relates to a language learning apparatus and a method therefor for enabling a system to automatically learn languages through interaction with users and an external environment by using speech processing techniques, dialog processing techniques, robot control technologies, sensor technologies, etc. which represent natural language processing techniques.

2. Description of the Related Art

Generally, algorithms for learning languages are used for outputting language knowledge (vocabularies and syntax rules) by using a set of language information and non-language information as an input.

The language information is information which can be inferred during communication, while the non-language information is information which cannot be directly inferred during communication.

An overview of various conventional language learning methods according to the types of given language information and non-language information and the types of language knowledge to be learned is shown in FIG. 7.

According to a first method, by supplying "a preposition and nouns (text) placed before and after the preposition" as the language information and "the meaning of the preposition (symbolic representation indicating, for example, the entry number in the dictionary) as the non-language information, "the meaning of the preposition dependent on the nouns before and after (symbolic representation)" is learned as the language knowledge (see C. Harris "A connectionist approach to the story of 'over'", Berkeley Linguistic Society, 15, pp. 126–138, 1989).

According to a second method, by supplying "a preposition, a verb, and a noun (text)" as the language information and "the meaning of a preposition (symbolic representation)" as the non-language information, "the meaning of the preposition dependent on the verb and the noun (symbolic representation)" is learned as the language knowledge (see P. Munro et al. "A network for encoding, decoding and translating locative prepositions", Cognitive Science, Vol. 3, pp. 225–240, 1991).

According to a third method, by supplying "a sentence (text)" as the language information and "whether the reaction made by the system is true or false" as the non-language information, "the contribution rate of the word for the system's reaction", i.e., "what kind of reaction the system should make in response to a certain word string?" is learned (see A. L. Gorin et al. "Adaptive acquisition of language", Computer Speech and Language, Vol.5, pp.101–132, 1991).

According to a fourth method, by supplying "a sentence (text)" as the language information and "the semantic representation of the symbolic sentence" as the non-language information, "the meaning of the word (symbolic representation)" is learned as the language knowledge (see J. M. Siskind, "A computation study of cross-situation techniques for learning word-to-meaning mappings", Cognition, Vol.61, pp.39–91, 1996).

According to a fifth method, by supplying "a sentence (text) and symbolic vocabulary information" as the language information (non-language information is not given), "the syntax rules" are learned as the language knowledge (see Berwick, "The acquisition of syntactic knowledge", MIT Press, 1985).

According to a sixth method, by supplying "a word (text)" as the language information and "graphics (computer graphics)" as the non-language information, "the meaning of the word (graphic pattern) is learned as the language knowledge (see S. Nakagawa et al. An acquisition system of concept and grammar based on combining with visual and auditory information, Transactions of IPSJ, Vol.10, No.4, pp.129–137, 1994).

According to a seventh method, by supplying "a word (sound)" as the language information and "graphics (computer graphics)" as the non-language information, "the meaning of the word (graphic pattern)" is learned as the language knowledge (see T. Regier, "The Human Semantic Potential", MIT Press, 1997).

According to an eighth method, by supplying "a sentence (isolated word speech) as the language information and "whether the reaction made by the system is true or false" as the non-language information, "the contribution rate of the word for the system's reaction" is learned as the language knowledge (see A. L. Gorin et al., "An experiment in spoken language acquisition", IEEE Transactions on speech and audio processing, Vol.2. No.1, pp.224–240, 1994).

In the above-described conventional learning methods, however, when a sentence (text or sound) is given as the language information, and when perceptual information, such as visual information or sensory information, whose meaning is not explicitly given as the non-language information, only the meaning of the word can be learned.

SUMMARY OF THE INVENTION

Accordingly, in view of the above background, it is an object of the present invention to provide a language learning apparatus and a method therefor in which, even in response to perceptual information whose meaning is not explicitly given, the syntax structure can be determined and the syntax rules of the input language can be learned based on the determined syntax structure.

In order to achieve the above object, according to one aspect of the present invention, there is provided a language learning apparatus including a recognition portion for receiving language information and for extracting a word string according to the input language information. A semantic analyzing portion receives perceptual information related to the language information and extracts concepts and a concept representation indicating the relevance of the concepts. A relevance analyzing portion verifies the word string extracted by the recognition portion against the concept representation extracted by the semantic analyzing portion and determines a syntax structure of the word string according to the relevance between the word string and the concept representation.

According to another aspect of the present invention, there is provided a language learning apparatus including a speech recognition portion for receiving speech information and for extracting a word string according to the input speech information. A semantic analyzing portion receives perceptual information related to the speech information and extracts concepts and a concept representation indicating the relevance of the concepts. A relevance analyzing portion verifies the word string extracted by the speech recognition portion against the concept representation extracted by the semantic analyzing portion and determines a syntax structure of the word string according to the relevance between the word string and the concept representation.

According to still another aspect of the present invention, there is provided a language learning apparatus including a syntax-structure analyzing unit and a syntax-rule learning unit. The syntax-structure analyzing unit has a recognition portion for receiving language information and for extracting a word string according to the input language information. A semantic analyzing portion receives perceptual information related to the language information and extracts concepts and a concept representation indicating the relevance of the concepts. A relevance analyzing portion verifies the word string extracted by the recognition portion against the concept representation extracted by the semantic analyzing portion and determines a syntax structure of the word string according to the relevance between the word string and the concept representation. The syntax-rule learning unit receives the syntax structure determined by the relevance analyzing portion of the syntax-structure analyzing unit and learns a syntax rule.

According to a further aspect of the present invention, there is provided a language learning apparatus including a syntax-structure analyzing unit and a syntax-rule learning unit. The syntax-structure analyzing unit has a speech recognition portion for receiving speech information and for extracting a word string according to the input speech information. A semantic analyzing portion receives perceptual information related to the speech information and extracts concepts and a concept representation indicating the relevance of the concepts. A relevance analyzing portion verifies the word string extracted by the speech recognition portion against the concept representation extracted by the semantic analyzing portion and determines a syntax structure of the word string according to the relevance between the word string and the concept representation. The syntax-rule learning unit receives the syntax structure determined by the relevance analyzing portion of the syntax-structure analyzing unit and learns a syntax rule.

The aforementioned language learning apparatus may further include a vocabulary-information storage unit for storing vocabulary information for recognizing the language information or the speech information and vocabulary information for recognizing the perceptual information. The recognition portion or the speech recognition portion may recognize the language information or the speech information, respectively, based on the vocabulary information stored in the vocabulary-information storage unit. The semantic analyzing portion may analyze the perceptual information based on the vocabulary information stored in the vocabulary-information storage unit.

The aforementioned language learning apparatus may further include a vocabulary-information storage unit for storing vocabulary information for recognizing the language information or the speech information and vocabulary information for recognizing the perceptual information. The recognition portion or the speech recognition portion may recognize the language information or the speech information, respectively, based on the vocabulary information stored in the vocabulary-information storage unit and may report a vocabulary checked for recognizing the language information or the speech information to the semantic analyzing portion. The semantic analyzing portion may analyze the perceptual information by searching the vocabulary information stored in the vocabulary-information storage unit concerning only the vocabulary reported from the recognition portion or the speech recognition portion.

In the foregoing language learning apparatus, the syntax-rule learning unit may output information of the learned syntax rule to the recognition portion or the speech recognition portion of the syntax-structure analyzing unit. The recognition portion or the speech recognition portion may recognize the language information or the speech information, respectively, based on the vocabulary information stored in the vocabulary-information storage unit and the information of the syntax rule learned by the syntax-rule learning unit.

According to a yet further aspect of the present invention, there is provided a language learning method including: a first extraction step of extracting a word string from language information; a second extraction step of extracting concepts and a concept representation indicating the relevance of the concepts from perceptual information related to the language information; and a determination step of determining a syntax structure of the word string according to the relevance between the extracted word string and the extracted concept representation by verifying the word string against the concept representation.

According to a further aspect of the present invention, there is provided a language learning method including: a first extraction step of extracting a word string from speech information; a second extraction step of extracting concepts and a concept representation indicating the relevance of the concepts from perceptual information related to the speech information; and a determination step of determining a syntax structure of the word string according to the relevance between the extracted word string and the extracted concept representation by verifying the word string against the concept representation.

According to a further aspect of the present invention, there is provided a language learning method including: a first extraction step of extracting a word string from language information; a second extraction step of extracting concepts and a concept representation indicating the relevance of the concepts from perceptual information related to the language information; a determination step of determining a syntax structure of the word string according to the relevance between the extracted word string and the extracted concept representation by verifying the word string against the concept representation; and a learning step of learning a syntax rule based on the determined syntax structure.

According to a further aspect of the present invention, there is provided a language learning method including: a first extraction step of extracting a word string from speech information; a second extraction step of extracting concepts and a concept representation indicating the relevance of the concepts from perceptual information related to the speech information; a determination step of determining a syntax structure of the word string according to the relevance between the extracted word string and the extracted concept representation by verifying the word string against the concept representation; and a learning step of learning a syntax rule based on the determined syntax structure.

In the above-described language learning method, the second extraction step may search only for the concepts of words contained in the word string and may extract the corresponding concept representation.

In the above-described language learning method, the first extraction step may extract the word string based on the learned syntax rule.

In the present invention, the perceptual information may include still image information, moving picture information, touch information, acceleration information, and pressure information.

In the present invention, the syntax rule may include a probability context-free grammar, a modification grammar, and a probability modification grammar.

According to the present invention, language information or speech information is input into the recognition portion or the speech recognition portion, respectively, and a word string corresponding to the input information is extracted.

Meanwhile, perceptual information related to the language information or the speech information, such as moving picture information, still image information, touch information, acceleration information, or pressure information, is input into the semantic analyzing portion, and concepts and a concept representation indicating the relevance of the concepts are extracted from the input perceptual information.

In the relevance analyzing portion, the word string extracted by the recognition portion or the speech recognition portion is verified against the concept representation extracted by the semantic analyzing portion, and the syntax structure of the word string is determined according to the relevance between the word string and the concept representation.

In the syntax-rule learning unit, the syntax rule is learned based on the syntax structure determined by the relevance analyzing portion.

The syntax rule learned by the syntax-rule learning unit may be supplied to the recognition portion or the speech recognition portion, which may then extract the word string based on the learned syntax rule. With this configuration, even if perceptual information whose meaning is not explicitly given is supplied, the syntax structure can be determined. The syntax rule of the input language can also be learned based on the determined syntax structure.

Additionally, in determining the concept representation from the perceptual information, the concepts only corresponding to the words contained in an input word (string) are searched rather than searching all the concepts, and only the corresponding concept representation are extracted, thereby making concept searching more efficient.

BRIEF DESCRIPTION OF THE DRAWINGS

FIG. 7 illustrates conventional language learning methods.

DESCRIPTION OF THE PREFERRED EMBODIMENTS

First Embodiment

Figure 1:
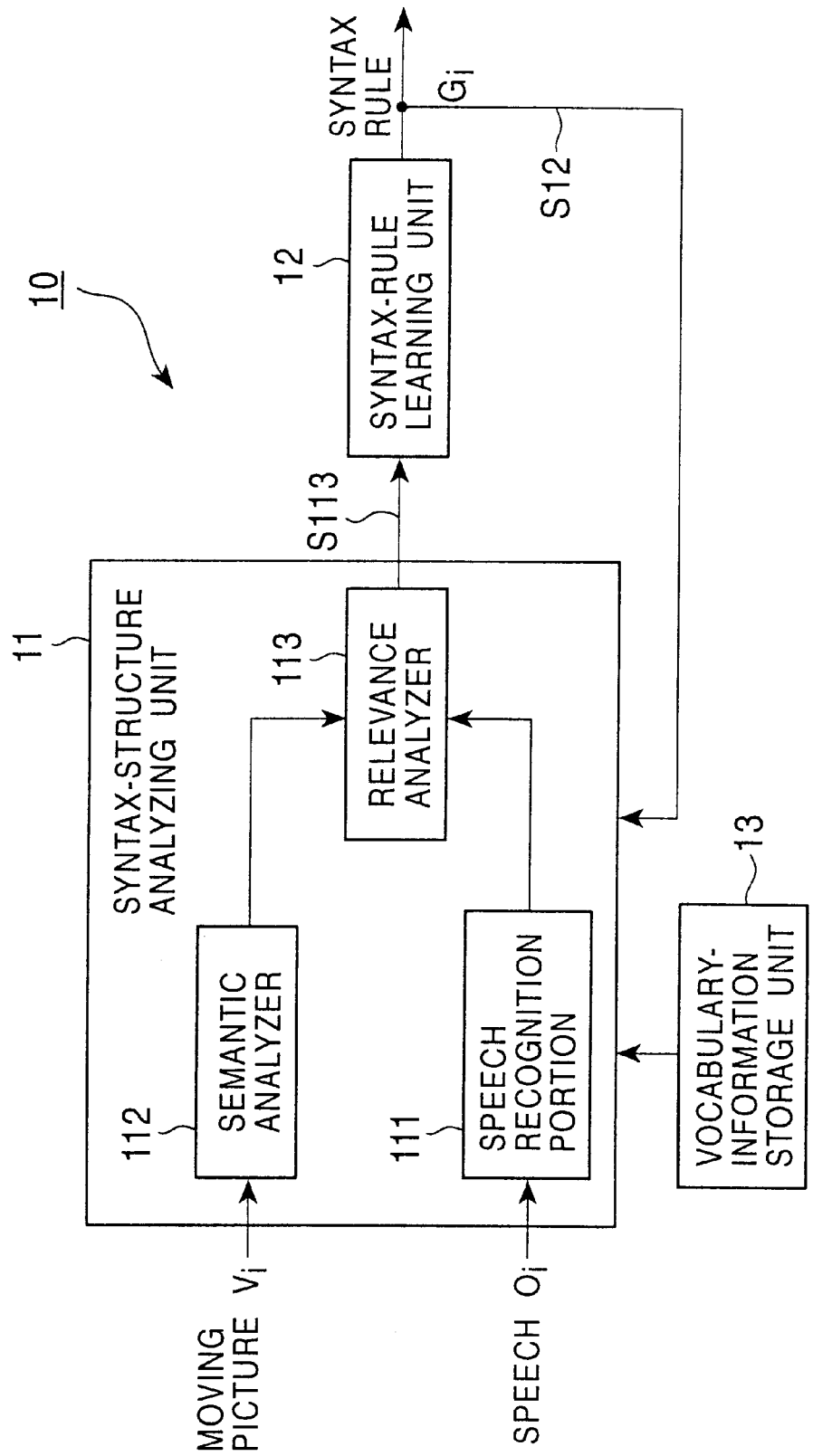
FIG. 1 is a block diagram illustrating a language learning apparatus employing a language learning method according to a first embodiment of the present invention.

A language learning apparatus employing a language learning method according to a first embodiment of the present invention is shown in FIG. 1. In the first embodiment, moving picture information is used as sensory information for obtaining perceptual information.

A language learning apparatus 10 shown in FIG. 1 includes a syntax-structure analyzing unit 11, a syntax-rule learning unit 12, and a vocabulary-information storage unit 13.

The syntax-structure analyzing unit 11 is formed of, as shown in FIG. 1, a speech recognition portion 111, a semantic analyzer 112, and a relevance analyzer 113. The syntax-structure analyzing unit 11 processes input speech data $O_i$ and the corresponding moving picture data $V_i$ and determines the syntax structure in response to the input speech.

The speech recognition portion 111 recognizes the input speech, which is the language information, based on speech pattern information represented by speech pattern identifiers (not shown) contained in the vocabulary-information storage unit 13, and outputs the corresponding word string to the relevance analyzer 113.

More specifically, the speech recognition portion 111 converts an audio signal into features (for example, time-series cepstrum coefficients) and recognizes the word index (string) by using the speech pattern identifiers (for example, Hidden Markov Models (HMMs)).

The speech recognition portion 111 outputs, for example, the following words:

put, rotate, ball, blue, and block.

The speech recognition portion 111 also receives a syntax information signal S12 learned by the syntax-rule learning unit 12 and generates a word string S' based on the following expression:

$$S'=argmax\{P_L(S,G_i) \times P_A(S,O_i,\Lambda)\}s \qquad (1)$$

where $O_i$ represents speech data, $G_i$ indicates a syntax rule given by the signal S12, $\Lambda$ designates a set of speech pattern identifiers contained in the vocabulary-information storage unit 13, and $P_L$ and $P_A$ indicate functions for representing the probability of the syntax and the probability of the acoustic pattern, respectively.

The semantic analyzer 112 detects image patterns from the moving picture data $V_i$, which serves as the input perceptual information, by using image pattern identifiers (not shown) contained in the vocabulary-information storage unit 13, and analyzes the relevance of the image patterns, which information is then output to the relevance analyzer 113 as the semantic representation using the words corresponding to the detected image patterns.

More specifically, the semantic analyzer 112 converts the moving picture data $V_i$ into features, for example, time-series parameters representing the position and the color of the object, and extracts the individual concepts (vocabulary) contained in the moving picture by using the image pattern identifiers (for example, HMMs). The semantic analyzer 112 further determines the semantic representation as the relevance of the individual concepts (vocabulary).

For example, if the moving picture represents "placing the rotating red ball on the blue block on the right side", the following semantic representation can be obtained:

[action]: put

[object]: rotate, red, ball

[to]: blue, block, right.

In the above example, [action], [object], and [to] are attributes indicating the positioning of the individual concepts according to their relevance.

Figure 2:
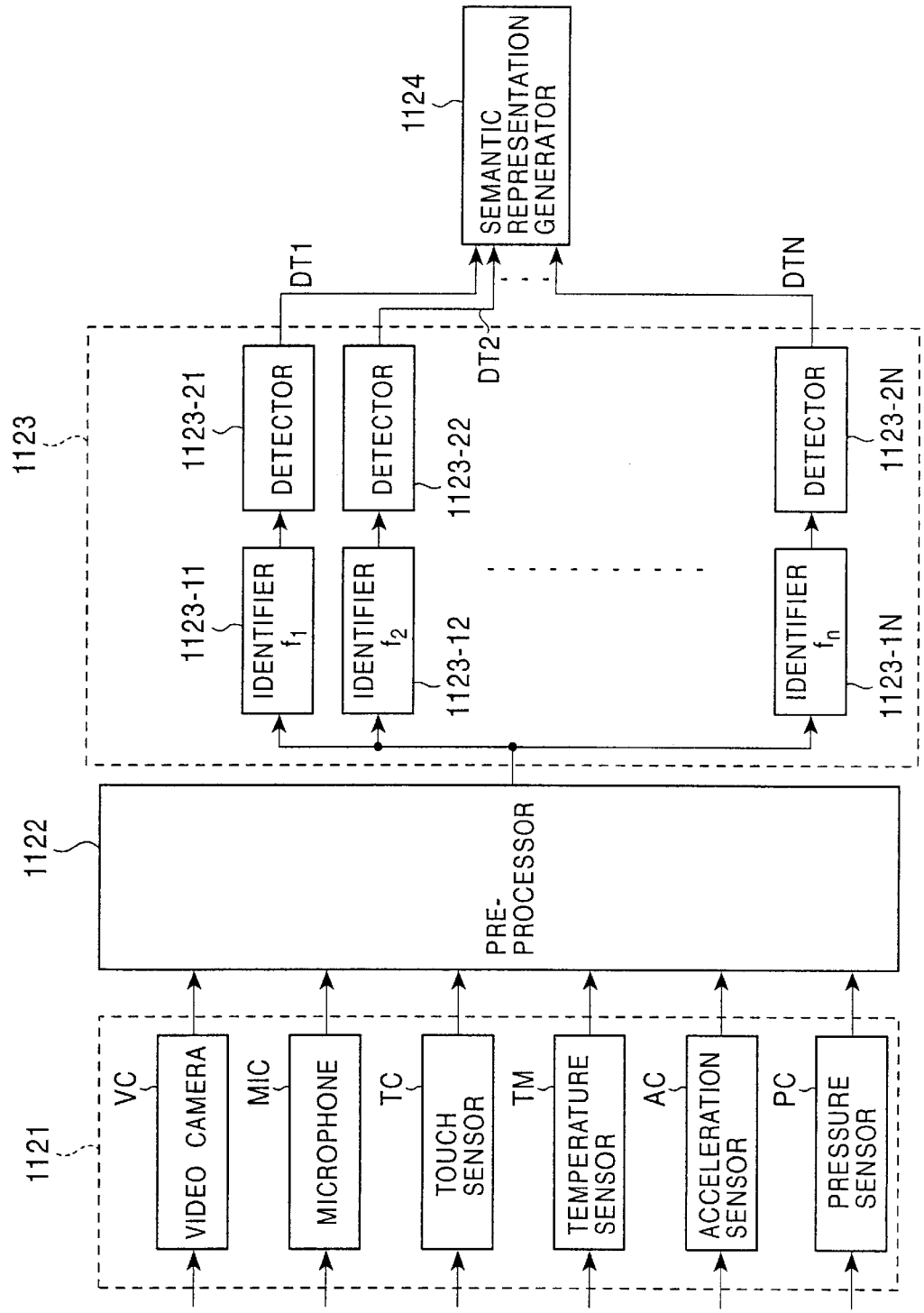
FIG. 2 is a block diagram illustrating an example of the specific configuration of a semantic analyzer 112 of the language learning apparatus shown in FIG. 1.

FIG. 2 is a block diagram illustrating the specific configuration of the semantic analyzer 112. The semantic analyzer 112 includes, as shown in FIG. 2, a sensor 1121, a pre-processor 1122, a word-set output portion 1123, and a semantic representation generator 1124.

The sensor 1121 senses a stimulus in response to a specific object (hereinafter referred to as a "given object"), and outputs the result to the pre-processor 1122.

In this embodiment, the sensor 1121 contains not only a video camera VC, which serves as a device for converting light into an electrical signal so as to obtain moving picture information, but also a microphone MIC, which serves as a device for converting sound into an electrical signal, a touch sensor TC, a temperature sensor TM, an acceleration sensor AC, a pressure sensor PC, etc. The sensor 1121 is thus able to sense the color, the shape, the size, the position, the direction, the speed, etc. of the given object.

In response to the output of the sensor 1121, the pre-processor 1122 extracts feature parameters (feature vectors). More specifically, the pre-processor 1122 determines feature parameters of the information obtained by the measurements of the given object by the sensor 1121, that is, the parameters representing the features of the given object, such as the color, the shape, the size, the position, the direction, the speed, etc., and outputs the feature parameters to the word-set output portion 1123.

The word-set output portion 1123 has N identifiers 1123-11 through 1123-1N and N detectors 1123-21 through 1123-2N.

The identifiers 1123-11 through 1123-1N identify the given object by pattern recognition based on the feature parameters extracted from the given subject, and output the identified results to the detectors 1123-21 through 1123-2N, respectively.

More specifically, the identifiers 1123-11 through 1123-1N respectively store ID functions $f_1$ through $f_n$ (models) for identifying an object represented by certain words #1 through #n and respectively determine the ID functions $f_1$ through $f_n$ by using the feature parameters output from the pre-processor 1122.

The identifiers 1123-11 through 1123-1N then respectively output the calculation results of the ID functions $f_1$ through $f_n$, text notation and audio notation of the words #1 through #n representing the object to be identified by the ID functions $f_1$, through $f_n$, and the ID functions $f_1$ through $f_n$ to the detectors 1123-21 through 1123-2N, which then use the identification results of the object represented by the words #1 through #n as function values.

The detectors 1123-21 through 1123-2N compare the function values computed by the corresponding identifiers 1123-11 through 1123-1N with preset thresholds. If the function values are found to be equal to or greater than the thresholds, the detectors 1123-21 through 1123-2N generate detection signals DT1 through DTN and output them to the semantic representation generator 1124.

In this case, the detectors 1123-21 through 1123-2N extract the individual concepts (vocabulary) contained in the moving picture. For example, if the moving picture indicates "placing the rotating red ball on the blue block on the right side", as stated above, the following vocabulary is obtained:

put, rotate, red, ball, blue, block, and right.

Upon receiving one or more detection signals from the corresponding detectors 1123-21 through 1123-2N, the semantic representation generator 1124 determines a semantic representation as the relevance of the individual words (vocabulary) contained in the moving picture represented by the input detection signal.

That is, if the moving picture represents "placing the rotating red ball on the blue block on the right side", as discussed above, the following semantic representation may be obtained:

[action]: put
[object]: rotate, red, ball
[to]: blue, block, right.

The relevance analyzer 113 receives the word string from the speech recognition portion 111 and the semantic representation information output from the semantic analyzer 112 and checks the word string against the semantic representation, thereby determining the syntax structure of the word string, which is then output to the syntax-rule learning unit 12 as a signal S113.

More specifically, the following syntax structure is obtained in the relevance analyzer 113:

(([action] put ([object] rotate, ball ([to] blue, block)).

The syntax-rule learning unit 12 learns the syntax by using the syntax structure information output from the syntax-structure analyzing unit 11. The syntax-rule learning unit 12 also outputs the learned syntax rules to the syntax-structure analyzing unit 11, and more particularly, to the speech recognition portion 111, as a syntax information signal S12.

To learn the syntax models by the syntax-rule learning unit 12, the probability context-free grammar, which uses concept attributes as the terminal symbols, may be employed (see J. K. Baker, "Trainable grammars for speech recognition", Speech Communication Papers for the 97th meeting of the acoustical Society of America, pp.547–550, 1979). In this reference, the inductive learning method using the probability context-free grammar is also discussed.

Instead of using the probability context-free grammar, the modification grammar or the probability modification grammar may be used.

The syntax-rule learning unit 12 learns the syntax rules and also sequentially updates them. For example, when the syntax rule is indicated by $G_i$, the syntax information of the i-th data is represented by $T_i$, and the updating operation is indicated by F, the syntax-rule updating operation can be represented as follows:

$$G_i \leftarrow F(G_{i-1}, T_i).$$

For the syntax-rule learning of the syntax-rule learning unit 12, Bayesian learning may be employed.

For example, if the moving picture represents "placing the rotating red ball on the blue block on the right side" as stated above, the following semantic (concept) representation is obtained by the syntax-structure analyzing unit 11 and is supplied to the syntax-rule learning unit 12:

[action]: put
[object]: rotate, red, ball
[to]: blue, block, right.

Then, the following probability, for example, is learned in the syntax-rule learning unit 12:

$$P([S] \rightarrow [\text{action}][\text{object}]=$$

$$1-P([S][\text{object}][\text{action}]).$$

The B-distribution ($\alpha=\beta=5$) is preferentially used in the Bayesian learning.

As a result, vocabularies are learned after initially given strokes (for example, 60). Because of the use of the Bayesian learning, the concepts (vocabulary) can be obtained even with such a small number of learning strokes.

If the maximum likelihood learning is used instead of the Bayesian learning, the concept probability density function becomes too sharp due to a distribution of a small number of samples, which frequently causes non-instinctive errors in the scene analysis.

For example, a certain position near the left corner on the display will be recognized as the right side as long as the probability density function obtained by the concept "left" is sharper than that obtained by the concept "right".

Accordingly, to overcome this problem, in the Bayesian learning in this embodiment, the probability density function of the concepts is set to a lower level of sensitivity than that obtained by a distribution having a small number of learning samples.

In other words, in the syntax-rule learning unit 12 used in this embodiment, the probability density function of the concepts is set to a lower level of sensitivity than that obtained by a distribution having a small number of learning samples so that the probability can be prevented from being far from a correct value.

Figure 3:
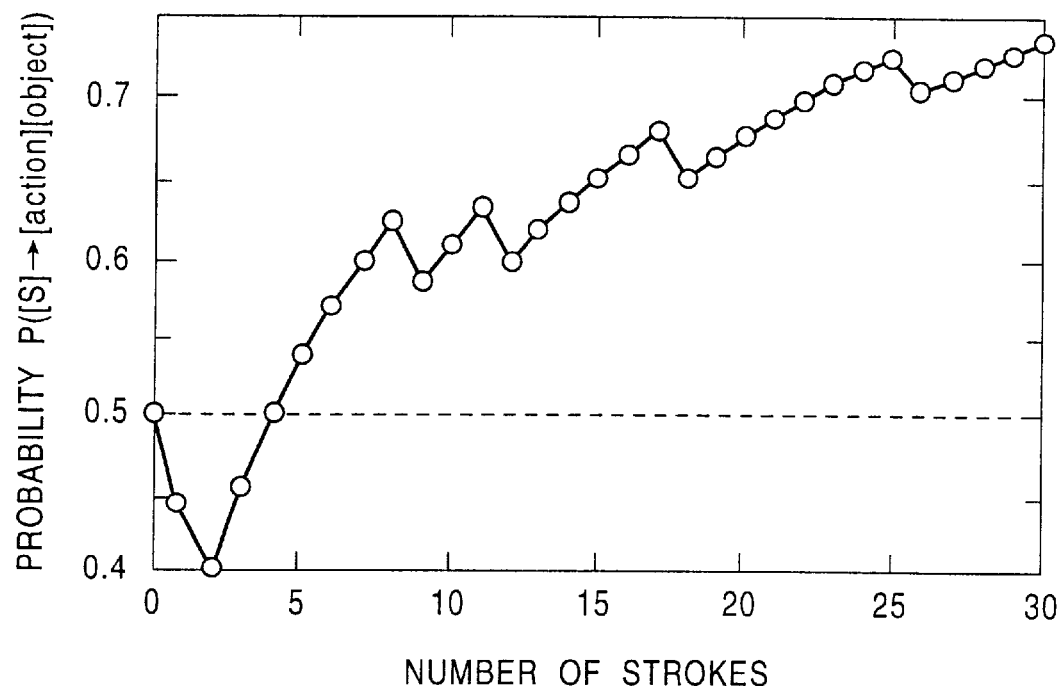
FIG. 3 illustrates a specific example of syntax rule learning in a syntax-rule learning unit shown in FIG. 1.

In the syntax-rule learning unit 12, the stochastic grammar is learned as expected. The value of the probability P([S]→[action] [object]) changes, as shown in FIG. 3. FIG. 3 reveals that learning is rough in response to the initial errors in the learning process.

The vocabulary-information storage unit 13 stores information of the vocabulary (words) concerning the position, the shape, the color, the size, and the motion of an object contained in, for example, a moving picture. The vocabulary is, for example, as follows:

right, left, top, bottom, middle, red, blue, yellow, green, gray, up, down, rotate, put, and slide.

Although word text is applied to each word of the vocabulary for convenience, the vocabulary is, in practice, parametrically formed of speech pattern identifiers and image pattern identifiers.

Figure 4:
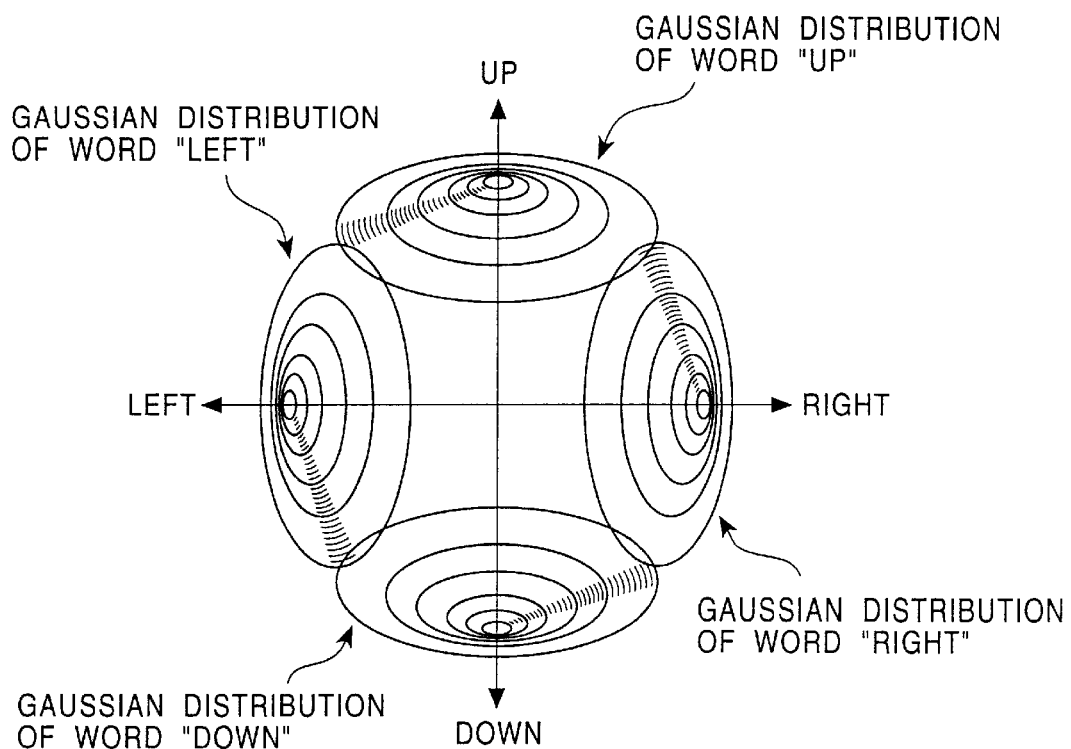
FIG. 4 illustrates Gaussian distributions in two-dimensional feature parameter space.

As the speech pattern identifiers, HMMs may be used. As the image pattern identifiers, HMMs or Gaussian distribution functions may be used. For example, in two-dimensional feature parameter space, the Gaussian distributions as the so-called "concept notation functions" representing the words "up", "down", "left", and "right" are positioned, as shown in FIG. 4, in such a manner that the occurrence probability becomes higher as the word is located closer to "up", "down", "left", or "right". In FIG. 4, the direction perpendicular to the plane of the drawing indicates the level of the probability, and portions having an equal level of the probability are connected by the same contours.

Figure 5:
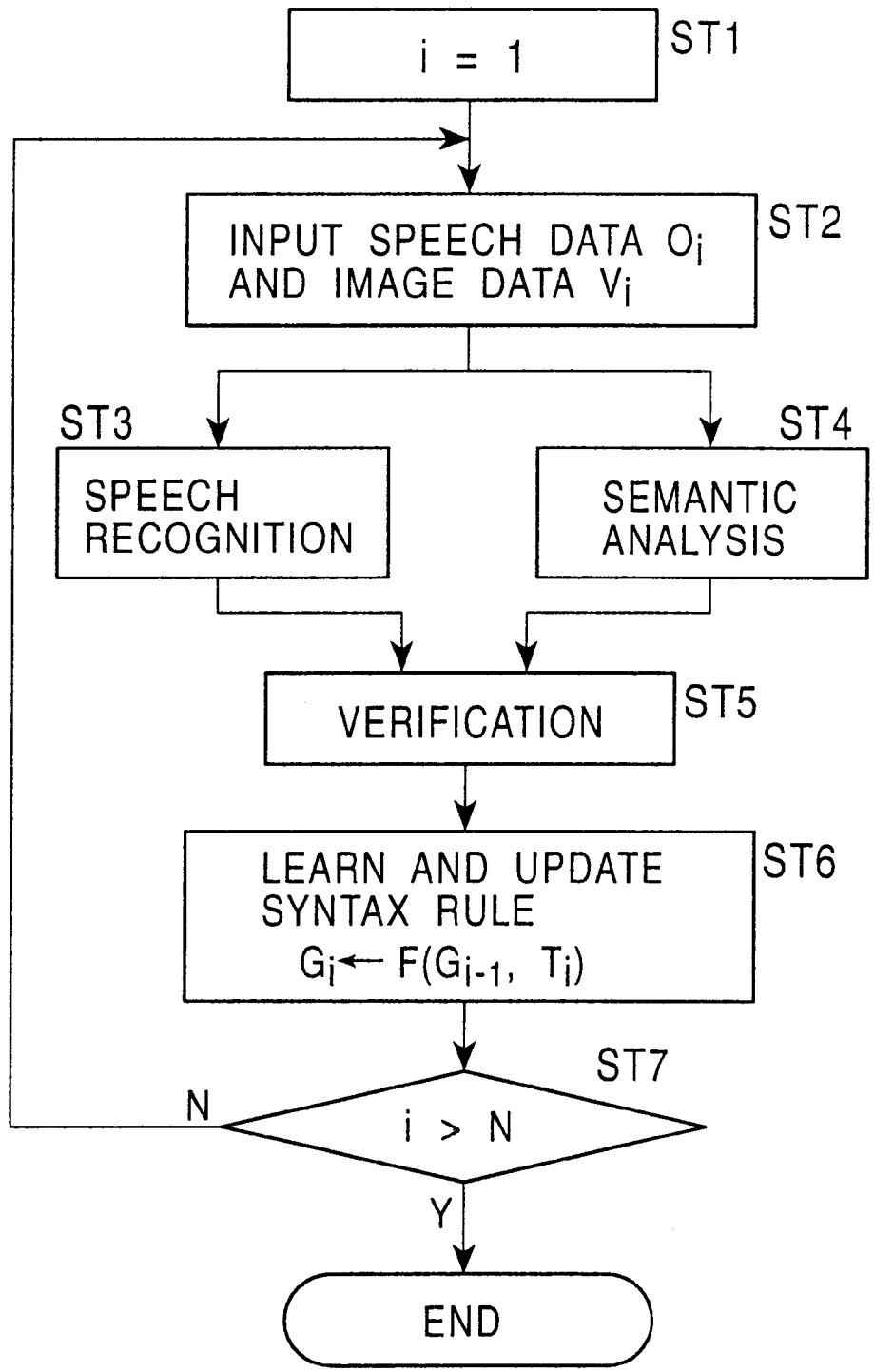
FIG. 5 is a flow chart illustrating the operation of the language learning apparatus shown in FIG. 1.

The operation of the above-configured language learning apparatus is discussed below with reference to FIG. 5.

In step ST1, the variable i is set to one. Then, in step ST2, speech data $Q_i$ as the language information is input into the speech recognition portion 111 of the syntax-structure analyzing unit 11, while moving picture data $V_i$ as perceptual information is input into the semantic analyzer 112.

In step ST3, the speech data $Q_i$ is converted into features represented by, for example, time-series cepstrum coefficients, so that the word string of the input speech as the language information is recognized based on the speech pattern information represented by the speech pattern identifiers (not shown) contained in the vocabulary information storage unit 13, and is output to the relevance analyzing unit 13.

In ST4, in the semantic analyzer 112, the moving picture data $V_i$ is converted into time-series parameters representing the position and the color of the object, and the image patterns are detected from the moving picture data $V_i$, which is the input perceptual information, by using the image pattern identifiers (not shown) contained in the vocabulary-information storage unit 13. Then, the relevance of the image patterns is analyzed so as to extract semantic representation using the words corresponding to the individual image patterns. The semantic representation is then output to the relevance analyzer 113.

Subsequently, in step ST5, the relevance analyzer 113 verifies the word string output from the speech recognition portion 111 against the semantic representation output from the semantic analyzer 112. The relevance analyzer 113 then determines the syntax structure of the word string based on the verification result and outputs it to the syntax-rule learning unit 12 as the signal S113.

Then, in step ST6, in the syntax-rule learning unit 12, the syntax rule is learned by using the syntax structure output from the syntax-structure analyzing unit 11, and the learned syntax information $G_i$ is output to the speech recognition portion 111 of the syntax-structure analyzing unit 11 as the syntax information signal S12.

The number of items of data required for learning is determined to be N. It is then determined in step ST7 whether i exceeds N. If the outcome of step ST7 is yes, the process is completed. If the result of step ST7 is no, the above-described steps ST2 through ST6 are repeated until i exceeds N.

In this case, upon receiving the syntax information signal S12 learned by the syntax-rule learning unit 12, the speech recognition portion 111 generates the word string S' based on the aforementioned equation (1). That is, the word string is generated by using the syntax rule learned in the syntax-rule learning unit 12.

In step ST6, the syntax-rule learning unit 12 sequentially updates the syntax rules, as well as learning them. More specifically, when the syntax rule is indicated by $G_i$, the syntax information of the i-th data is represented by $T_i$, and the updating operation is indicated by F, the syntax-rule updating operation can be represented by $G_i \leftarrow F(G_{i-1}, T_i)$.

As is seen from the foregoing description, according to the first embodiment of the present invention, in the syntax-structure analyzing unit 11, the speech recognition portion 111 recognizes the word string from the speech data $O_i$ input as the language information based on the speech pattern information represented by the speech pattern identifiers (not shown) contained in the vocabulary-information storage unit 13. The semantic analyzer 112 detects the image patterns from the moving picture data $V_i$, which is the input perceptual information, by using the image pattern identifiers (not shown) contained in the vocabulary-information storage unit 13, and analyzes the relevance of the image patterns and outputs the semantic representation using the words corresponding to the individual image patterns. Then, the relevance analyzer 113 verifies the word string output from the speech recognition portion 111 against the semantic representation output from the semantic analyzer 112 and determines the syntax structure of the word string. Subsequently, the syntax-rule learning unit 12 learns the syntax by using the syntax structure information output from the syntax-structure analyzing unit 11, and outputs the learned syntax to the speech recognition portion 111 as the syntax information signal S12. With this configuration, even when perceptual information whose meaning is not explicitly given is supplied, the syntax structure can be determined. Additionally, the syntax rule of the input language can be learned based on the determined syntax structure, thereby enhancing the learning reliability.

Although in this embodiment moving picture information is used as the perceptual information (sensory information), other types of sensory information, such as still image information, touch sensory information, acceleration sensory information, or pressure sensory information, may be used.

Second Embodiment

Figure 6:
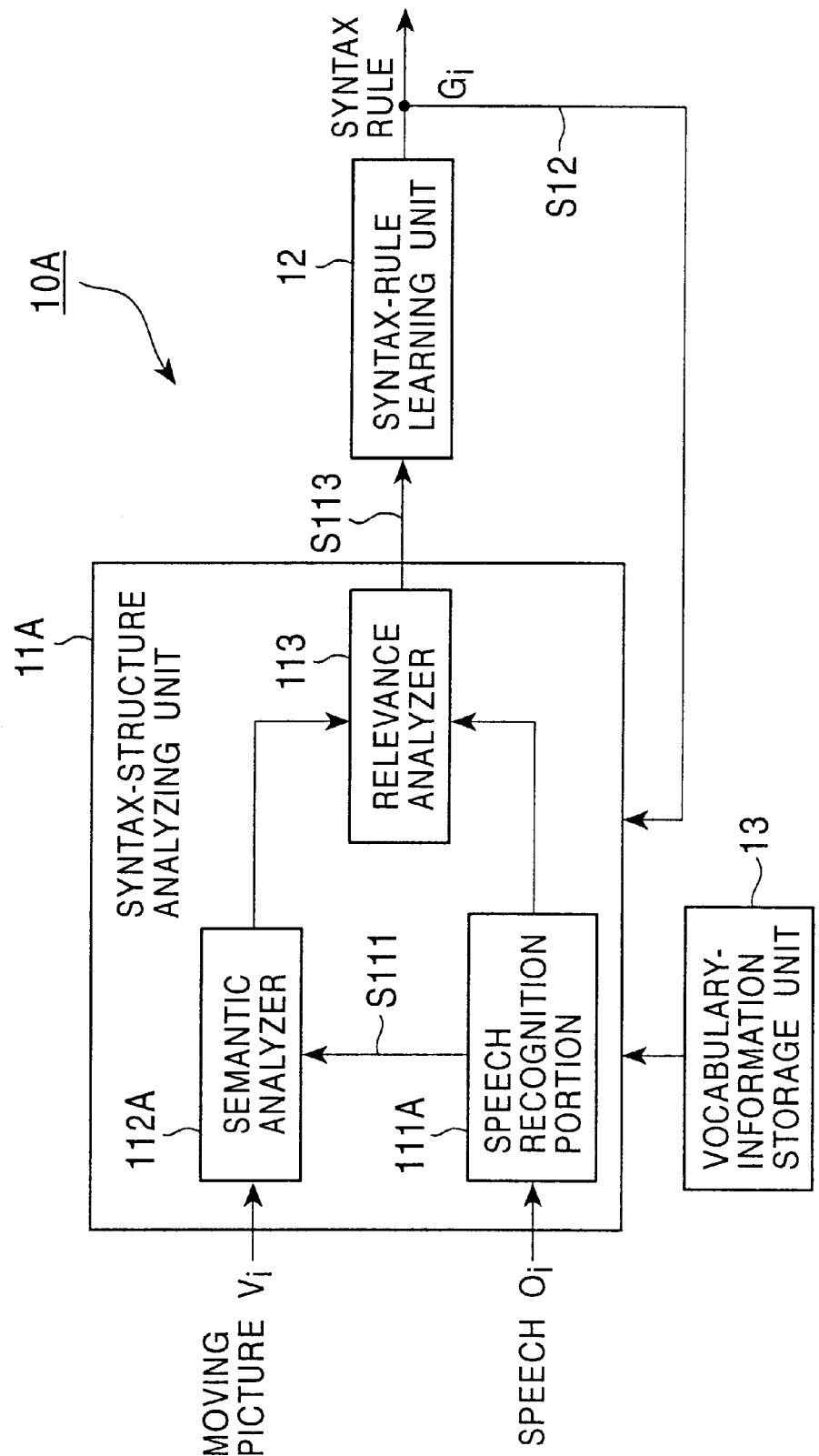
FIG. 6 is a block diagram illustrating a language learning apparatus employing a language learning method according to a second embodiment of the present invention.

FIG. 6 is a block diagram illustrating a language learning apparatus employing a language learning method according to a second embodiment of the present invention.

A language learning apparatus 10A of the second embodiment differs from that of the first embodiment in that concept searching is made more efficient by searching the perceptual information (sensory information) for the concepts only corresponding to the words contained in an input word (string) rather than for all the concepts and by extracting only the corresponding concept representation.

More specifically, in a syntax-structure analyzing unit 11A, as in the first embodiment, a speech recognition portion 11A recognizes the word string of the input speech based on the vocabulary information stored in the vocabulary-information storage unit 13, and reports the vocabulary checked for recognizing the word string to a semantic analyzer 112A as a signal S111.

The semantic analyzer 112A then searches for the vocabulary information concerning the vocabulary reported from the speech recognition portion 11A, thereby analyzing the perceptual information.

The other configuration of the second embodiment is similar to that of the first embodiment.

According to the second embodiment, in addition to the advantages obtained by the first embodiment, the processing efficiency is further enhanced.

What is claimed is:

1. A language learning apparatus comprising:
    a recognition portion for receiving language information and for extracting a word string according to the input language information;
    a semantic analyzing portion for receiving perceptual information related to the language information and for extracting concepts and a concept representation indicating the relevance of the concepts; and
    a relevance analyzing portion for verifying the word string extracted by said recognition portion against the concept representation extracted by said semantic analyzing portion and for determining a syntax structure of the word string according to the relevance between the word string and the concept representation.

2. A language learning apparatus according to claim 1, further comprising a vocabulary-information storage unit for storing vocabulary information for recognizing the language information and vocabulary information for recognizing the perceptual information,
    wherein said recognition portion recognizes the language information based on the vocabulary information stored in said vocabulary-information storage unit, and said semantic analyzing portion analyzes the perceptual information based on the vocabulary information stored in said vocabulary-information storage unit.

3. A language learning apparatus according to claim 1, further comprising a vocabulary-information storage unit for storing vocabulary information for recognizing the language information and vocabulary information for recognizing the perceptual information,
    wherein said recognition portion recognizes the language information based on the vocabulary information stored in said vocabulary-information storage unit and reports a vocabulary checked for recognizing the language information to said semantic analyzing portion, and said semantic analyzing portion analyzes the perceptual information by searching the vocabulary information stored in said vocabulary-information storage unit concerning only the vocabulary reported from said recognition portion.

4. A language learning apparatus according to claim 1, wherein said semantic analyzing portion comprises a sensor for obtaining moving picture information as the perceptual information.

5. A language learning apparatus according to claim 1, wherein said semantic analyzing portion comprises a sensor for obtaining still image information as the perceptual information.

6. A language learning apparatus according to claim 1, wherein said semantic analyzing portion comprises a sensor for obtaining touch information as the perceptual information.

7. A language learning apparatus according to claim 1, wherein said semantic analyzing portion comprises a sensor for obtaining acceleration information as the perceptual information.

8. A language learning apparatus according to claim 1, wherein said semantic analyzing portion comprises a sensor for obtaining pressure information as the perceptual information.

9. A language learning apparatus comprising:
    a speech recognition portion for receiving speech information and for extracting a word string according to the input speech information;
    a semantic analyzing portion for receiving perceptual information related to the speech information and for extracting concepts and a concept representation indicating the relevance of the concepts; and
    a relevance analyzing portion for verifying the word string extracted by said speech recognition portion against the concept representation extracted by said semantic analyzing portion and for determining a syntax structure of the word string according to the relevance between the word string and the concept representation.

10. A language learning apparatus according to claim 9, further comprising a vocabulary-information storage unit for storing vocabulary information for recognizing the speech information and vocabulary information for recognizing the perceptual information,
    wherein said speech recognition portion recognizes the speech information based on the vocabulary information stored in said vocabulary-information storage unit, and said semantic analyzing portion analyzes the perceptual information based on the vocabulary information stored in said vocabulary-information storage unit.

11. A language learning apparatus according to claim 9, further comprising a vocabulary-information storage unit for storing vocabulary information for recognizing the speech information and vocabulary information for recognizing the perceptual information,
    wherein said speech recognition portion recognizes the speech information based on the vocabulary information stored in said vocabulary-information storage unit and reports a vocabulary checked for recognizing the speech information to said semantic analyzing portion, and said semantic analyzing portion analyzes the perceptual information by searching the vocabulary information stored in said vocabulary-information storage unit concerning only the vocabulary reported from said speech recognition portion.

12. A language learning apparatus according to claim 9, wherein said semantic analyzing portion comprises a sensor for obtaining moving picture information as the perceptual information.

13. A language learning apparatus according to claim 9, wherein said semantic analyzing portion comprises a sensor for obtaining still image information as the perceptual information.

14. A language learning apparatus according to claim 9, wherein said semantic analyzing portion comprises a sensor for obtaining touch information as the perceptual information.

15. A language learning apparatus according to claim 9, wherein said semantic analyzing portion comprises a sensor for obtaining acceleration information as the perceptual information.

16. A language learning apparatus according to claim 9, wherein said semantic analyzing portion comprises a sensor for obtaining pressure information as the perceptual information.

17. A language learning apparatus comprising:
- a syntax-structure analyzing unit including a recognition portion for receiving language information and for extracting a word string according to the input language information, a semantic analyzing portion for receiving perceptual information related to the language information and for extracting concepts and a concept representation indicating the relevance of the concepts, and a relevance analyzing portion for verifying the word string extracted by said recognition portion against the concept representation extracted by said semantic analyzing portion and for determining a syntax structure of the word string according to the relevance between the word string and the concept representation; and
- a syntax-rule learning unit for receiving the syntax structure determined by said relevance analyzing portion of said syntax-structure analyzing unit and for learning a syntax rule.

18. A language learning apparatus according to claim 17, further comprising a vocabulary-information storage unit for storing vocabulary information for recognizing the language information and vocabulary information for recognizing the perceptual information,
  wherein said recognition portion recognizes the language information based on the vocabulary information stored in said vocabulary-information storage unit, and said semantic analyzing portion analyzes the perceptual information based on the vocabulary information stored in said vocabulary-information storage unit.

19. A language learning apparatus according to claim 18, wherein said syntax-rule learning unit outputs information of the learned syntax rule to said recognition portion of said syntax-structure analyzing unit, and said recognition portion recognizes the language information based on the vocabulary information stored in said vocabulary-information storage unit and the information of the syntax rule learned by said syntax-rule learning unit.

20. A language learning apparatus according to claim 17, further comprising a vocabulary-information storage unit for storing vocabulary information for recognizing the language information and vocabulary information for recognizing the perceptual information, wherein said recognition portion recognizes the language information based on the vocabulary information stored in said vocabulary-information storage unit and reports a vocabulary checked for recognizing the language information to said semantic analyzing portion, and said semantic analyzing portion analyzes the perceptual information by searching for the vocabulary information stored in said vocabulary-information storage unit concerning only the vocabulary reported from said recognition portion.

21. A language learning apparatus according to claim 20, wherein said syntax-rule learning unit outputs information of the learned syntax rule to said recognition portion of said syntax-structure analyzing unit, and said recognition portion recognizes the language information based on the vocabulary information stored in said vocabulary-information storage unit and the information of the syntax rule learned by said syntax-rule learning unit.

22. A language learning apparatus according to claim 17, wherein said syntax-rule learning unit outputs information of the learned syntax rule to said recognition portion of said syntax-structure analyzing unit, and said recognition portion recognizes the language information based on the information of the syntax rule learned by said syntax-rule learning unit.

23. A language learning apparatus according to claim 17, wherein said semantic analyzing portion comprises a sensor for obtaining moving picture information as the perceptual information.

24. A language learning apparatus according to claim 17, wherein said semantic analyzing portion comprises a sensor for obtaining still image information as the perceptual information.

25. A language learning apparatus according to claim 17, wherein said semantic analyzing portion comprises a sensor for obtaining touch information as the perceptual information.

26. A language learning apparatus according to claim 17, wherein said semantic analyzing portion comprises a sensor for obtaining acceleration information as the perceptual information.

27. A language learning apparatus according to claim 17, wherein said semantic analyzing portion comprises a sensor for obtaining pressure information as the perceptual information.

28. A language learning apparatus according to claim 17, wherein said syntax-rule learning unit uses a probability context-free grammar as the syntax rule.

29. A language learning apparatus according to claim 17, wherein said syntax-rule learning unit uses a modification grammar as the syntax rule.

30. A language learning apparatus according to claim 17, wherein said syntax-rule learning unit uses a probability modification grammar as the syntax rule.

31. A language learning apparatus comprising:
- a syntax-structure analyzing unit including a speech recognition portion for receiving speech information and for extracting a word string according to the input speech information, a semantic analyzing portion for receiving perceptual information related to the speech information and for extracting concepts and a concept representation indicating the relevance of the concepts, and a relevance analyzing portion for verifying the word string extracted by said speech recognition portion against the concept representation extracted by said semantic analyzing portion and for determining a syntax structure of the word string according to the relevance between the word string and the concept representation; and
- a syntax-rule learning unit for receiving the syntax structure determined by said relevance analyzing portion of said syntax-structure analyzing unit and for learning a syntax rule.

32. A language learning apparatus according to claim 31, further comprising a vocabulary-information storage unit for storing vocabulary information for recognizing the speech information and vocabulary information for recognizing the perceptual information, wherein said speech recognition portion recognizes the speech information based on the vocabulary information stored in said vocabulary-information storage unit, and said semantic analyzing portion analyzes the perceptual information based on the vocabulary information stored in said vocabulary-information storage unit.

33. A language learning apparatus according to claim 32, wherein said syntax-rule learning unit outputs information of the learned syntax rule to said speech recognition portion of said syntax-structure analyzing unit, and said speech recognition portion recognizes the speech information based on the vocabulary information stored in said vocabulary-information storage unit and the information of the syntax rule learned by said syntax-rule learning unit.

34. A language learning apparatus according to claim 31, further comprising a vocabulary-information storage unit for storing vocabulary information for recognizing the speech information and vocabulary information for recognizing the perceptual information,
wherein said speech recognition portion recognizes the speech information based on the vocabulary information stored in said vocabulary-information storage unit and reports a vocabulary checked for recognizing the speech information to said semantic analyzing portion, and said semantic analyzing portion analyzes the perceptual information by searching the vocabulary information stored in said vocabulary-information storage unit concerning only the vocabulary reported from said speech recognition portion.

35. A language learning apparatus according to claim 34, wherein said syntax-rule learning unit outputs information of the learned syntax rule to said speech recognition portion of said syntax-structure analyzing unit, and said speech recognition portion recognizes the speech information based on the vocabulary information stored in said vocabulary-information storage unit and the information of the syntax rule learned by said syntax-rule learning unit.

36. A language learning apparatus according to claim 31, wherein said syntax-rule learning unit outputs information of the learned syntax rule to said speech recognition portion of said syntax-structure analyzing unit, and said speech recognition portion recognizes the speech information based on the information of the syntax rule learned by said syntax-rule learning unit.

37. A language learning apparatus according to claim 31, wherein said semantic analyzing portion comprises a sensor for obtaining moving picture information as the perceptual information.

38. A language learning apparatus according to claim 31, wherein said semantic analyzing portion comprises a sensor for obtaining still image information as the perceptual information.

39. A language learning apparatus according to claim 31, wherein said semantic analyzing portion comprises a sensor for obtaining touch information as the perceptual information.

40. A language learning apparatus according to claim 31, wherein said semantic analyzing portion comprises a sensor for obtaining acceleration information as the perceptual information.

41. A language learning apparatus according to claim 31, wherein said semantic analyzing portion comprises a sensor for obtaining pressure information as the perceptual information.

42. A language learning apparatus according to claim 31, wherein said syntax-rule learning unit uses a probability context-free grammar as the syntax rule.

43. A language learning apparatus according to claim 31, wherein said syntax-rule learning unit uses a modification grammar as the syntax rule.

44. A language learning apparatus according to claim 31, wherein said syntax-rule learning unit uses a probability modification grammar as the syntax rule.

45. A language learning method comprising:
a first extraction step of extracting a word string from language information;
a second extraction step of extracting concepts and a concept representation indicating the relevance of the concepts from perceptual information related to the language information; and
a determination step of determining a syntax structure of the word string according to the relevance between the extracted word string and the extracted concept representation by verifying the word string against the concept representation.

46. A language learning method according to claim 45, wherein said second extraction step searches only for the concepts of words contained in the word string and extracts the corresponding concept representation.

47. A language learning method according to claim 45, wherein said perceptual information comprises still image information.

48. A language learning method according to claim 45, wherein said perceptual information comprises moving picture information.

49. A language learning method according to claim 45, wherein said perceptual information comprises touch information.

50. A language learning method according to claim 45, wherein said perceptual information comprises acceleration information.

51. A language learning method according to claim 45, wherein said perceptual information comprises pressure information.

52. A language learning method comprising:
a first extraction step of extracting a word string from speech information;
a second extraction step of extracting concepts and a concept representation indicating the relevance of the concepts from perceptual information related to the speech information; and
a determination step of determining a syntax structure of the word string according to the relevance between the extracted word string and the extracted concept representation by verifying the word string against the concept representation.

53. A language learning method according to claim 52, wherein said second extraction step searches only for the concepts of words contained in the word string and extracts the corresponding concept representation.

54. A language learning method according to claim 52, wherein said perceptual information comprises still image information.

55. A language learning method according to claim 52, wherein said perceptual information comprises moving picture information.

56. A language learning method according to claim 52, wherein said perceptual information comprises touch information.

57. A language learning method according to claim 52, wherein said perceptual information comprises acceleration information.

58. A language learning method according to claim 52, wherein said perceptual information comprises pressure information.

59. A language learning method comprising:
- a first extraction step of extracting a word string from language information;
- a second extraction step of extracting concepts and a concept representation indicating the relevance of the concepts from perceptual information related to the language information;
- a determination step of determining a syntax structure of the word string according to the relevance between the extracted word string and the extracted concept representation by verifying the word string against the concept representation; and
- a learning step of learning a syntax rule based on the determined syntax structure.

60. A language learning method according to claim 59, wherein said second extraction step searches only for the concepts of words contained in the word string and extracts the corresponding concept representation.

61. A language learning method according to claim 60, wherein said first extraction step extracts the word string based on the learned syntax rule.

62. A language learning method according to claim 59, wherein said first extraction step extracts the word string based on the learned syntax rule.

63. A language learning method according to claim 59, wherein said perceptual information comprises still image information.

64. A language learning method according to claim 59, wherein said perceptual information comprises moving picture information.

65. A language learning method according to claim 59, wherein said perceptual information comprises touch information.

66. A language learning method according to claim 59, wherein said perceptual information comprises acceleration information.

67. A language learning method according to claim 59, wherein said perceptual information comprises pressure information.

68. A language learning method according to claim 59, wherein said syntax rule comprises a probability context-free grammar.

69. A language learning method according to claim 59, wherein said syntax rule comprises a modification grammar.

70. A language learning method according to claim 59, wherein said syntax rule comprises a probability modification grammar.

71. A language learning method comprising:
- a first extraction step of extracting a word string from speech information;
- a second extraction step of extracting concepts and a concept representation indicating the relevance of the concepts from perceptual information related to the speech information;
- a determination step of determining a syntax structure of the word string according to the relevance between the extracted word string and the extracted concept representation by verifying the word string against the concept representation; and
- a learning step of learning a syntax rule based on the determined syntax structure.

72. A language learning method according to claim 71, wherein said second extraction step searches only for the concepts of words contained in the word string and extracts the corresponding concept representation.

73. A language learning method according to claim 71, wherein said first extraction step extracts the word string based on the learned syntax rule.

74. A language learning method according to claim 71, wherein said first extraction step extracts the word string based on the learned syntax rule.

75. A language learning method according to claim 71, wherein said perceptual information comprises still image information.

76. A language learning method according to claim 71, wherein said perceptual information comprises moving picture information.

77. A language learning method according to claim 71, wherein said perceptual information comprises touch information.

78. A language learning method according to claim 71, wherein said perceptual information comprises acceleration information.

79. A language learning method according to claim 71, wherein said perceptual information comprises pressure information.

80. A language learning method according to claim 71, wherein said syntax rule comprises a probability context-free grammar.

81. A language learning method according to claim 71, wherein said syntax rule comprises a modification grammar.

82. A language learning method according to claim 71, wherein said syntax rule comprises a probability modification grammar.

* * * * *